United States Patent
Yu et al.

(10) Patent No.: US 11,416,966 B2
(45) Date of Patent: Aug. 16, 2022

(54) METHOD AND SYSTEM FOR IMAGE SCALING AND ENHANCEMENT

(71) Applicant: Realtek Semiconductor Corp., HsinChu (TW)

(72) Inventors: Chia-Wei Yu, HsinChu (TW); Yi-Ting Bao, HsinChu (TW); Yen-Lin Chen, HsinChu (TW); Shang-Yen Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 161 days.

(21) Appl. No.: 16/924,215

(22) Filed: Jul. 9, 2020

(65) Prior Publication Data

US 2021/0264566 A1 Aug. 26, 2021

(30) Foreign Application Priority Data

Feb. 20, 2020 (TW) ................................ 109105411

(51) Int. Cl.
   *G06T 5/00* (2006.01)
   *G06T 3/40* (2006.01)
   (Continued)

(52) U.S. Cl.
   CPC .......... *G06T 3/4046* (2013.01); *G06T 3/4076* (2013.01); *G06T 5/50* (2013.01);
   (Continued)

(58) Field of Classification Search
   CPC ................ G06T 3/4053; G06T 3/4046; G06T 2207/20081; G06T 2207/20084; G06T 5/001
   See application file for complete search history.

(56) References Cited

U.S. PATENT DOCUMENTS

| 10,489,887 | B2 | 11/2019 | El-khamy |
| 2019/0370938 | A1* | 12/2019 | Huang .................... G06T 5/001 |

(Continued)

FOREIGN PATENT DOCUMENTS

| CN | 101794440 A | 8/2010 |
| CN | 108921783 A | 11/2018 |

OTHER PUBLICATIONS

Wang, Chaofeng, Zheng Li, and Jun Shi. "Lightweight image super-resolution with adaptive weighted learning network." arXiv preprint arXiv: 1904.02358 (2019).*

(Continued)

*Primary Examiner* — Li Liu
(74) *Attorney, Agent, or Firm* — Winston Hsu

(57) ABSTRACT

A system for image scaling and enhancement is provided. The system includes a scaling processing unit, a deep-learning residue network unit and a combination unit. The filter scaling processing unit is configured to upscale a low-resolution image to output a high-resolution image. The deep-learning residue network unit is operated based on a deep-learning result, and configured to output a high-resolution residue image corresponding to the low-resolution image. The combination unit is configured to adjust the high-resolution residue image according to a weighting factor and combine an adjusted high-resolution residue image and the high-resolution image, in order to output an enhanced image, wherein the weighting factor is different from a reference weighting factor being used in a deep-learning procedure for training the deep-learning residue network unit.

9 Claims, 3 Drawing Sheets

(51) Int. Cl.
*G06T 5/50* (2006.01)
*G06T 7/90* (2017.01)
(52) U.S. Cl.
CPC ...... *G06T 7/90* (2017.01); *G06T 2207/10024* (2013.01); *G06T 2207/20081* (2013.01); *G06T 2207/20084* (2013.01); *G06T 2207/20221* (2013.01)

(56) References Cited

U.S. PATENT DOCUMENTS

| | | | | |
|---|---|---|---|---|
| 2020/0302576 | A1* | 9/2020 | Xu | G06T 3/4053 |
| 2021/0004935 | A1* | 1/2021 | Yao | G06T 3/4053 |
| 2021/0049740 | A1* | 2/2021 | Cho | G06T 3/4053 |
| 2021/0158103 | A1* | 5/2021 | Doddamani | G06N 3/04 |

OTHER PUBLICATIONS

Liu, Ding, et al. "Learning a mixture of deep networks for single image super-resolution." Asian Conference on Computer Vision. Springer, Cham, 2016.*

Kim, Jiwon, Jung Kwon Lee, and Kyoung Mu Lee. "Accurate image super-resolution using very deep convolutional networks." Proceedings of the IEEE conference on computer vision and pattern recognition. 2016.*

Liu, Zhi-Song, et al. "Hierarchical back projection network for image super-resolution." Proceedings of the IEEE/CVF Conference on Computer Vision and Pattern Recognition Workshops. 2019.*

S. Dai, M. Han, W. Xu, Y. Wu, Y. Gong and A. K. Katsaggelos, "SoftCuts: A Soft Edge Smoothness Prior for Color Image Super-Resolution," in IEEE Transactions on Image Processing, vol. 18, No. 5, pp. 969-981, May 2009, doi: 10.1109/TIP.2009.2012908.*

Lim, Bee, et al. "Enhanced deep residual networks for single image super-resolution." Proceedings of the IEEE conference on computer vision and pattern recognition workshops. 2017.*

Yu ,Wide Activation for Efficient and Accurate Image Super-Resolution ,Dec. 21, 2018.

Yang ,Deep Learning for Single Image Super-Resolution: A Brief Review ,Jul. 12, 2019.

Dong ,Image Super-Resolution Using Deep Convolutional Networks ,Jul. 31, 2015.

* cited by examiner

METHOD AND SYSTEM FOR IMAGE SCALING AND ENHANCEMENT

BACKGROUND OF THE INVENTION

1. Field of the Invention

The invention relates to super-resolution algorithms, and more particularly to a method and system for image scaling and enhancement based on a deep-learning architecture.

2. Description of the Prior Art

In recent years, single image super resolution algorithm, which is able to reconstruct low-resolution images into high-resolution images, has been widely developed. Among these algorithms, the algorithm of deep-learning convolutional neural network based on deep-learning architecture has achieved good results. However, in practical applications, the deep-learning super-resolution algorithm shows a deficiency of lacking adjustability. Generally, after the deep learning procedure of a neural network is completed, sharpness of the image cannot be adjusted unless the neural network is retrained. On the other hand, with current deep-learning super-resolution algorithms, a set of fixed parameters will be applied on the entire image. Hence, it is not possible to fine-tune local regions of the image, such as tuning a sky area in the image smoother, tuning a grass area sharper, or partially enhancing a region with many detailed textures. Therefore, developing a super-resolution algorithm with high adjustability is required.

SUMMARY OF THE INVENTION

With this in mind, an aspect of the present invention provides an image scaling and enhancement method/system. In the image scaling and enhancement method/system of the present invention, multiple image scaling techniques are used for super-resolution, which includes a deep-learning residue network based on deep-learning technology. In addition, by performing weight control on output results of the deep-learning residue network, image enhancement adjustability is improved. In the present invention, weight controlling can be adjusted in accordance with global characteristics or local characteristics (such as edges or colors) of an input image. In this way, the present invention improves the adjustability of the deep-learning residue network, thereby providing an image scaling and enhancement method and system with good adaptability to various scenarios.

According to one embodiment of the present invention, an image scaling and enhancement system is provided. The system comprises: a scaling processing unit, a deep-learning residue network unit and a combination processing unit. The scaling processing unit is configured to upscale a low-resolution image to output a high-resolution image. The deep-learning residue network unit is configured to output a high-resolution residue image corresponding to the low-resolution image based on a deep-learning result. The combination processing unit is configured to adjust the high-resolution residue image according to a weighting factor, and combine an adjusted high-resolution residue image and the high-resolution image in order to generate an enhanced image, wherein the weighting factor is different from a reference weighting factor that is used in a deep-learning procedure for training the deep-learning residue network unit.

According to one embodiment of the present invention, an image scaling and enhancement method is provided. The method comprises: upscaling a low-resolution image to output a high-resolution image; based on a deep-learning result, outputting a high-resolution residue image corresponding to the low-resolution image; and adjusting the high-resolution residue image according to a weighting factor and combining an adjusted high-resolution residue image and the high-resolution image in order to generate an enhanced image, wherein the weighting factor is different from a reference weighting factor that is used in obtaining the deep-learning result.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
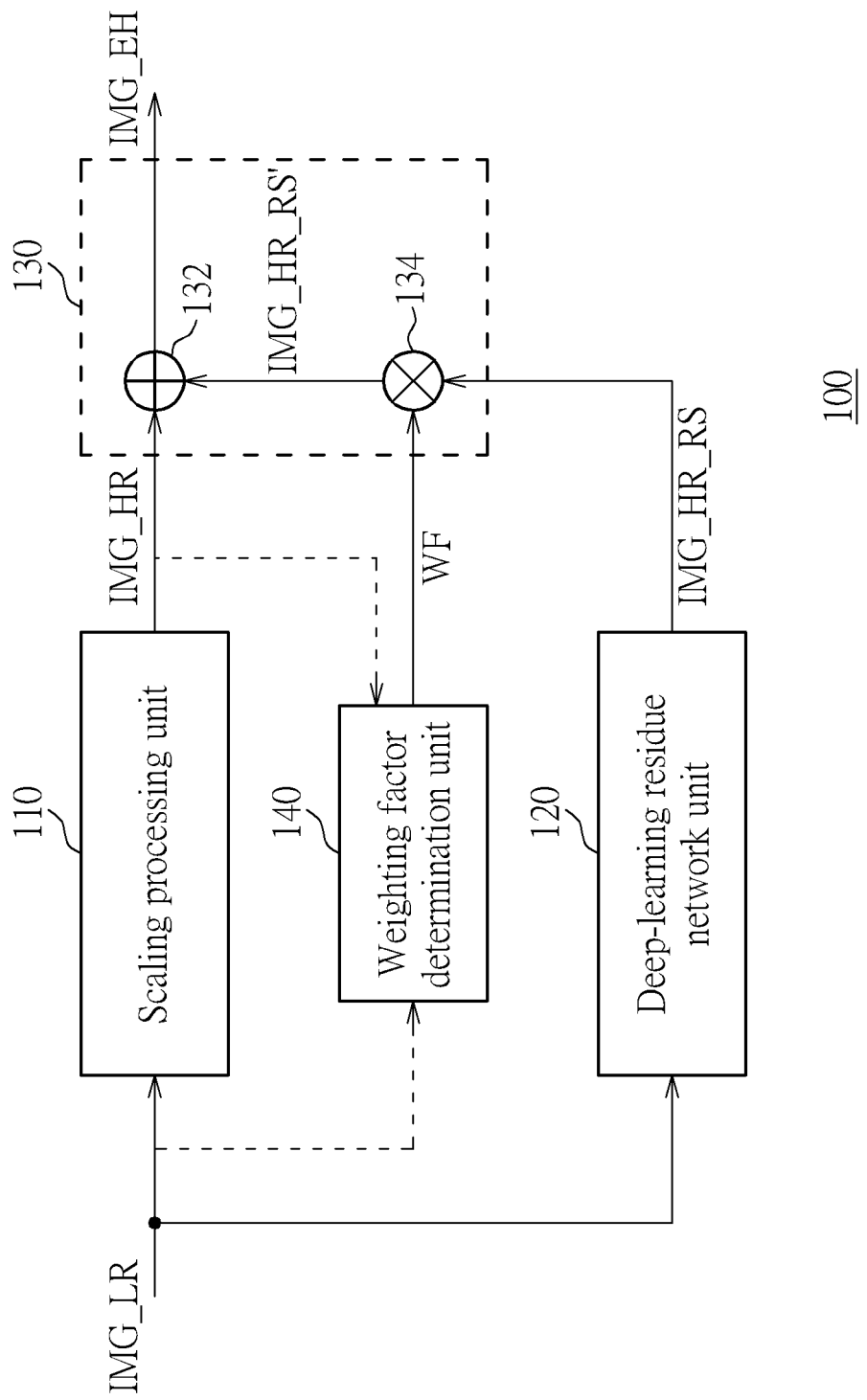
FIG. 1 is a schematic diagram illustrating structure of an image scaling and enhancement system according to one embodiment of the present invention.

FIG. 1 is a diagram illustrating structure of an image scaling and enhancement system according to one embodiment of the present invention. As illustrated, an image scaling and enhancement system 100 comprises: a scaling processing unit 110, a deep-learning residue network unit 120 and a combination processing unit 130. The scaling processing unit 110 is configured to upscale a low-resolution image IMG_LR to output a high-resolution image IMG_HR. In one embodiment, the scaling processing unit 110 could be an interpolation filter, which can accomplish image upscaling by performing interpolation operations, such as a bicubic filter. Alternatively, the scaling processing unit 110 could be an edge preserving scaler. Operations of the deep-learning residue network unit 120 are based on a deep-learning procedure. According to the low-resolution image IMG_LR, the deep-learning residue network unit 120 outputs a high-resolution residue image IMG_HR_RS corresponding to the low-resolution image IMG_LR. The combination processing unit 130 is configured to adjust the high-resolution residue image IMG_HR_RS according to a weighting factor WF and accordingly combine an adjusted high-resolution residue image IMG_HR_RS' and the high-resolution image IMG_HR, in order to generate an enhanced image IMG_EH. In one embodiment, the combination processing unit 130 can comprise an adder 132 and a multiplier unit 134. The multiplier 134 scales the high-resolution residue image IMG_HR_RS according to the weighting factor WF, thereby obtaining the adjusted high-resolution residue image IMG_HR_RS'. The adder 132 adds the adjusted high-resolution residue image IMG_HR_RS' to the high-resolution image IMG_HR, so as to obtain the enhanced image IMG_EH. The present invention is characterized in that the weighting factor WF is different from a weighting factor WF_O that is referred to for training the deep-learning residue network unit 120.

Figure 2:
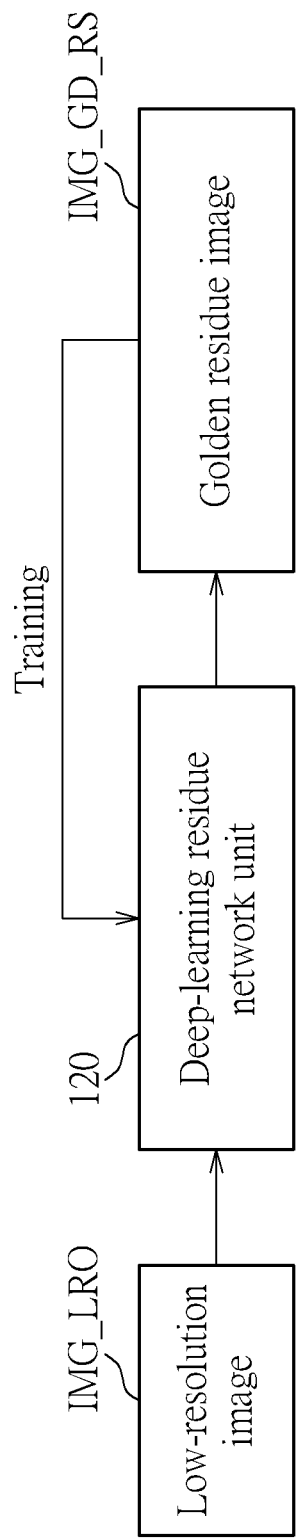
FIG. 2 is a schematic diagram illustrating a deep-learning procedure for training the deep-learning residue network unit.

Please refer to FIG. 2, which illustrates a deep-learning procedure for training the deep-learning residue network unit 120. The deep-learning residue network that is applied to the deep-learning residue network unit 120 can have an arbitrary number of layers or structures, such as multiple convolutional neural networks. The deep-learning residue network applied to the deep-learning residue network unit 120 can be trained with an input low-resolution image IMG_LRO and a corresponding target, golden high-resolution image IMG_GD. The final goal of training is to make the deep-learning residue network unit 120 to output a golden residue image IMG_GD_RS, which has the following relationship with the above-mentioned values:

$$WF\_O*IMG\_GD\_RS+IMG\_HRO=IMG\_GD$$

where IMG_HRO is the result of upscaling the input low-resolution image IMG_LRO by the scaling processing unit 110. In the deep-learning procedure for training the deep-learning residue network unit 120 of the present invention, the reference weighting factor WF_O is preset to 1, and therefore:

$$IMG\_GD\_RS=IMG\_GD-IMG\_HR$$

After training in the deep-learning procedure is completed, the deep-learning residue network unit 120 can generate a high-resolution residue image corresponding to the low-resolution image. In at least one embodiment of the present invention, the weighting factor WF employed by the combination processing unit 130 is different from the weighting factor WF_O=1 that is used in the above-mentioned deep-learning procedure. This allows the image scaling and enhancement system 100 to generate the enhanced image IMG_EH different from the golden high-resolution image IMG_GD, which is a final target of the deep-learning procedure. Such feature provides the image scaling and enhancement system 100 with adjustability. For example, when the weighting factor WF is greater than the weighting factor WF_O being used in the deep-learning procedure, an enhanced image IMG_EH with higher sharpness can be obtained. When the weighting factor WF is smaller than the weighting factor WF_O being used in the deep-learning procedure, an enhanced image IMG_EH with lower sharpness can be obtained. Please note that the above-mentioned low-resolution image IMG_LR or IMG_LRO, high-resolution image IMG_HR or IMG_HRO, enhanced image IMG_EH, high-resolution residue image IMG_HR_RS or IMG_HR_RS', golden residue image IMG_GD_RS, golden high-resolution image IMG_GD, can refer to pixel values of one or more pixels in an image/frame.

According to various embodiments of the present invention, the weighting factor WF that is employed by the combination processing unit 130 can be generated in various ways. In one embodiment, the image scaling and enhancement system 100 further comprises a weighting factor determination unit 140, which is configured to determine the weighting factor WF utilized by the combination processing unit 130. The weighting factor determination unit 140 can detect characteristics of an image to perform global adjustment. For example, the weighting factor determination unit 140 can determine different weighting factors WF for dynamic images and static images. Moreover, the weighting factor determination unit 140 can also determine the weighting factor WF according to some user-defined fixed values. In various embodiments, the weighting factor determination unit 140 can determine content characteristics (global or regional) of the image by referencing the input low-resolution image IMG_LR or the high-resolution image IMG_HR outputted by the scaling processing unit 110.

Moreover, the weighting factor determination unit 140 can determine the weighting factor WF for each pixel in the image, thereby to implement pixel-level image adjustment. In one embodiment, the weighting factor determination unit 140 can determine the weighting factor WF according to high-frequency characteristics or boundary strength of pixels around a specific pixel. For example, using Sobel filter with different dimensions (3×3, 5×5 or 7×7) can analyze the amount of high-frequency components in a region of the low-resolution image IMG_LR or the high-resolution image IMG_HR. As a result, it determines whether the region is a flat region or a detailed region. Alternatively, analyzing that a region includes horizontal edges or vertical edges can determine whether the region is an edge region. When regional characteristics of the image are determined, the weighting factor determination unit 140 can determine different weighting factors WF based on the analyzed regional characteristics.

In another embodiment, the weighting factor determination unit 140 can determine the weighting factor WF according to color characteristics of pixels around a specific pixel. For example, if a region of the image is in a color of skin-tone or blue, the weighting factor determination unit 140 can set the region with a lower weighting factor WF in order to obtain softer skin-tone areas or sky areas in the enhanced image IMG_EH. On the other hand, if a region of the image is in a color of green, the weighting factor determination unit 140 can set the region with a higher weighting factor WF in order to obtain sharper grass areas in the enhanced image IMG_EH.

In one embodiment, a value of the weighting factor WF can be smaller than 1 or smaller than the value of the reference weighting factor WF_O. This is because that, in an image/image region with specific patterns, the deep-learning residue network unit 120 can possibly produce bad outcomes, such as producing less effective enhancements or even adding noises to the image. Therefore, by setting a value less than 1 or less than the reference weighting factor WF_O to the weighting factor WF for an image region having specific patterns, such bad outcomes can be reduced.

Figure 3:
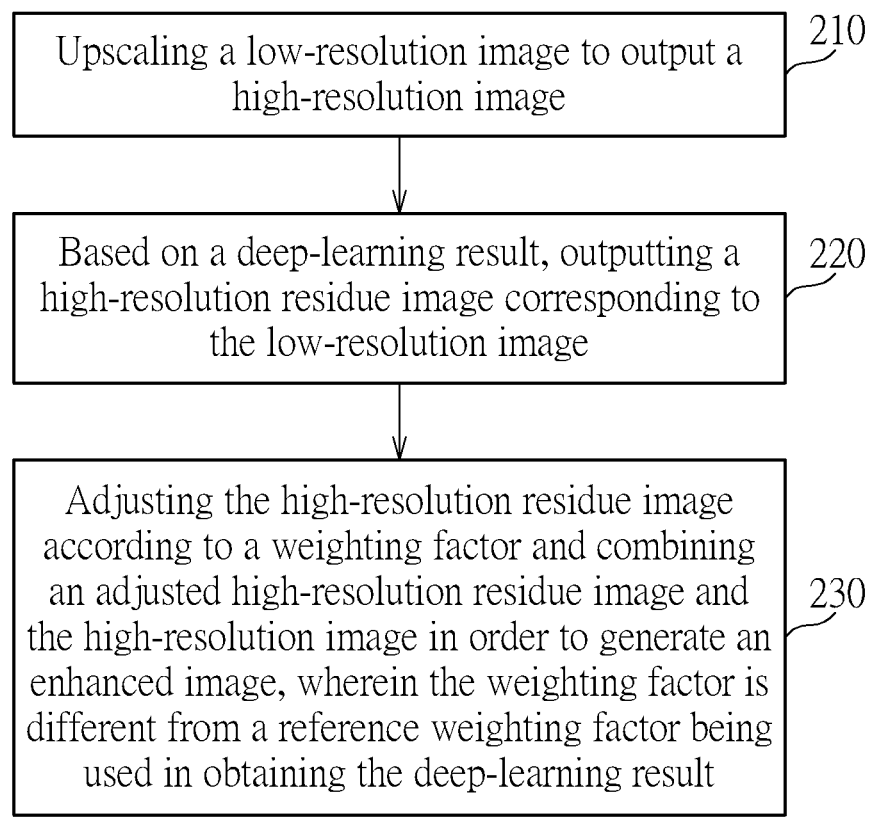
FIG. 3 is a flowchart illustrating an image scaling and enhancement method according to an embodiment of the present invention.

FIG. 3 is a flowchart of an image scaling and enhancement method according to an embodiment of the present invention. As shown in the figure, a process of the method substantially includes the following steps:

Step 210: upscaling a low-resolution image to output a high-resolution image;

Step 220: based on a deep-learning result, outputting a high-resolution residue image corresponding to the low-resolution image; and Step 230: adjusting the high-resolution residue image according to a weighting factor and combining an adjusted high-resolution residue image and the high-resolution image in order to generate an enhanced image, wherein the weighting factor is different from a reference weighting factor being used in obtaining the deep-learning result.

Specific principles and details of the above-mentioned steps have been explicitly illustrated in the descriptions regarding the image scaling and enhancement system 100. For the sake of brevity, further explanations of the method are omitted here.

In conclusion, the present invention provides an approach of sharpness adjustment depending on image characteristics by establishing weight control instead of retraining the deep-learning residue network unit. In addition, the present invention can also perform pixel-level weight control according to local characteristics of an image (such as edges or colors), thereby enhancing or weakening local details. In this way, the present invention improves adjustability of the deep-learning residue network unit, thereby providing an image scaling and enhancement system and method with good adaptability for various scenarios.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method can be made while retaining the teachings of the invention. Accordingly, the above disclosure should be construed as limited only by the metes and bounds of the appended claims.

What is claimed is:

1. An image scaling and enhancement system, comprising:
   a scaling processing unit, configured to upscale a low-resolution image to output a high-resolution image;
   a deep-learning residue network unit, operated based on a deep-learning result, configured to output a high-resolution residue image corresponding to the low-resolution image; and
   a combination processing unit, coupled to the scaling processing unit and the deep-learning residue network unit, configured to adjust the high-resolution residue image according to a weighting factor and combine an adjusted high-resolution residue image and the high-resolution image in order to generate an enhanced image, wherein the weighting factor is different from a reference weighting factor being used in a deep-learning procedure for training the deep-learning residue network unit;
   wherein the image scaling and enhancement system determines the weighting factor according to at least one of high-frequency characteristics, boundary strength and color characteristics of pixels around a specific pixel of one of the low-resolution image and the high-resolution image.

2. The system of claim 1, wherein the weighting factor is an user-defined fixed value or a value determined based on content characteristics of the low-resolution image.

3. The system of claim 1, further comprising:
   a weighting factor determination unit, coupled to the combination processing unit, configured to determine the weighting factor.

4. The system of claim 3, wherein the weighting factor determination unit is configured to determine the weighting factor for each pixel according to the low-resolution image.

5. The system of claim 3, wherein the weighting factor determination unit is configured to determine the weighting factor for each pixel according to the high-resolution image.

6. The system of claim 1, wherein the deep-learning residue network unit comprises an arbitrary number of layers or structures.

7. An image scaling and enhancement method, comprising:
   upscaling a low-resolution image to output a high-resolution image;
   based on a deep-learning result, outputting a high-resolution residue image corresponding to the low-resolution image;
   determining a weighting factor according to at least one of high-frequency characteristics, boundary strength and color characteristics of pixels around a specific pixel of one of the low-resolution image and the high-resolution image; and
   adjusting the high-resolution residue image according to the weighting factor and combining an adjusted high-resolution residue image and the high-resolution image in order to generate an enhanced image, wherein the weighting factor is different from a reference weighting factor being used in obtaining the deep-learning result.

8. The method of claim 7, wherein the weighting factor is an user-defined fixed value or a value determined based on content characteristics of the low-resolution image.

9. The method of claim 7, further comprising:
determining the weighting factor for each pixel according to one of the low-resolution image and the high-resolution image.

* * * * *